(12) United States Patent
Amsbeck

(10) Patent No.: US 10,225,532 B2
(45) Date of Patent: Mar. 5, 2019

(54) LIGHT MODULE

(71) Applicant: OSRAM GmbH, Munich (DE)

(72) Inventor: Dirk Amsbeck, Berlin (DE)

(73) Assignee: OSRAM GMBH, Munich (DE)

( * ) Notice: Subject to any disclaimer, the term of this patent is extended or adjusted under 35 U.S.C. 154(b) by 231 days.

(21) Appl. No.: 15/250,986

(22) Filed: Aug. 30, 2016

(65) Prior Publication Data

US 2017/0064270 A1 Mar. 2, 2017

(30) Foreign Application Priority Data

Sep. 2, 2015 (DE) .................... 10 2015 216 784

(51) Int. Cl.
| | |
|---|---|
| *H04N 9/31* | (2006.01) |
| *F21S 10/00* | (2006.01) |
| *F21V 14/08* | (2006.01) |
| *G02B 27/10* | (2006.01) |
| *G03B 21/00* | (2006.01) |
| *G02B 26/00* | (2006.01) |
| *G02B 27/14* | (2006.01) |
| *G03B 21/20* | (2006.01) |
| *G03B 33/08* | (2006.01) |
| *F21Y 115/30* | (2016.01) |

(52) U.S. Cl.
CPC .......... *H04N 9/3158* (2013.01); *F21S 10/007* (2013.01); *F21V 14/08* (2013.01); *G02B 26/008* (2013.01); *G02B 27/10* (2013.01); *G02B 27/148* (2013.01); *G03B 21/00* (2013.01); *G03B 21/204* (2013.01); *G03B 33/08* (2013.01); *H04N 9/3161* (2013.01); *H04N 9/3164* (2013.01); *F21Y 2115/30* (2016.08)

(58) Field of Classification Search
CPC .. H04N 9/3158; H04N 9/3161; H04N 9/3164; F21S 10/007; F21V 14/08; G02B 27/10; G03B 21/00
See application file for complete search history.

(56) References Cited

U.S. PATENT DOCUMENTS

2014/0111967 A1 4/2014 Rehn
2014/0254130 A1 9/2014 Mehl

FOREIGN PATENT DOCUMENTS

DE 102012219387 A1 4/2014
DE 102013203572 A1 9/2014

OTHER PUBLICATIONS

German Office Action based on application No. 10 2015 216 784.4 (9 pages) dated Jan. 26, 2016 (for reference purpose only).

*Primary Examiner* — Thomas M Sember
(74) *Attorney, Agent, or Firm* — Viering Jentschura & Partner MBB

(57) ABSTRACT

A light module includes an excitation radiation source, first phosphor, a beam splitting apparatus configured to generate a first and a second partial optical path, with one of the two partial optical paths comprising the first phosphor and the other one including the excitation radiation, a combining apparatus to merge the first and second paths, and an exit where the radiation from the merged paths can be made available. The apparatus includes a first rotatably mounted filter wheel is arranged between the source and the first phosphor and has a first transmission region and a first reflection region for the excitation radiation, and a second rotatably mounted filter wheel, which has at least one second transmission region and a second reflection region for the excitation radiation.

18 Claims, 4 Drawing Sheets

LIGHT MODULE

CROSS-REFERENCE TO RELATED APPLICATION

This application claims priority to German Patent Application Serial No. 10 2015 216 784.4, which was filed Sep. 2, 2015, and is incorporated herein by reference in its entirety.

TECHNICAL FIELD

Various embodiments relate generally to a light module including an excitation radiation source which is configured to emit excitation radiation, at least one first phosphor which is configured to convert incident excitation radiation to a first conversion radiation, a beam splitting apparatus which is configured to generate at least a first and a second partial optical path, with one of the two partial optical paths including the at least one first phosphor and the other one including, at least during specifiable time periods, the excitation radiation; a combining apparatus which is configured to merge at least the first and the second partial optical path, and an exit where the radiation from the merged partial optical paths can be made available as an output signal.

BACKGROUND

To generate white light in what are known as LARP (laser activated remote phosphor) systems which have a phosphor that emits in the yellow wavelength range, blue light must be added to the converted yellow light. The component of the blue light is critical for the color locus of the total luminous flux. Radiation whose spectrum is in the blue wavelength range is typically used as the excitation radiation.

In conventional LARP systems, which use a phosphor wheel, a blue channel is created via a slot in the phosphor wheel, and the blue excitation radiation is added to the converted light. The slot in the phosphor wheel is fixed in terms of size and position, and the blue component in the white light can be changed to a specific degree only by a pulsed current change of the laser diodes which are used for generating the excitation radiation. In other words, the output in the blue region of the phosphor wheel, i.e. in that region where the slot is arranged, can be maximized as compared to the operation with nominal power in that region of the phosphor wheel in which the phosphor emitting in the yellow wavelength range is arranged. However, operation with high output, above the nominal power, reduces the lifetime of the laser diodes. Yet increasing the size of the blue segment, i.e. the slot, leaves less segment region for the remaining coloration such that a larger tunable region comes at a price of a considerable loss in total luminous flux.

SUMMARY

A light module includes an excitation radiation source, first phosphor, a beam splitting apparatus configured to generate a first and a second partial optical path, with one of the two partial optical paths comprising the first phosphor and the other one including the excitation radiation, a combining apparatus to merge the first and second paths, and an exit where the radiation from the merged paths can be made available. The apparatus includes a first rotatably mounted filter wheel is arranged between the source and the first phosphor and has a first transmission region and a first reflection region for the excitation radiation, and a second rotatably mounted filter wheel, which has at least one second transmission region and a second reflection region for the excitation radiation.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
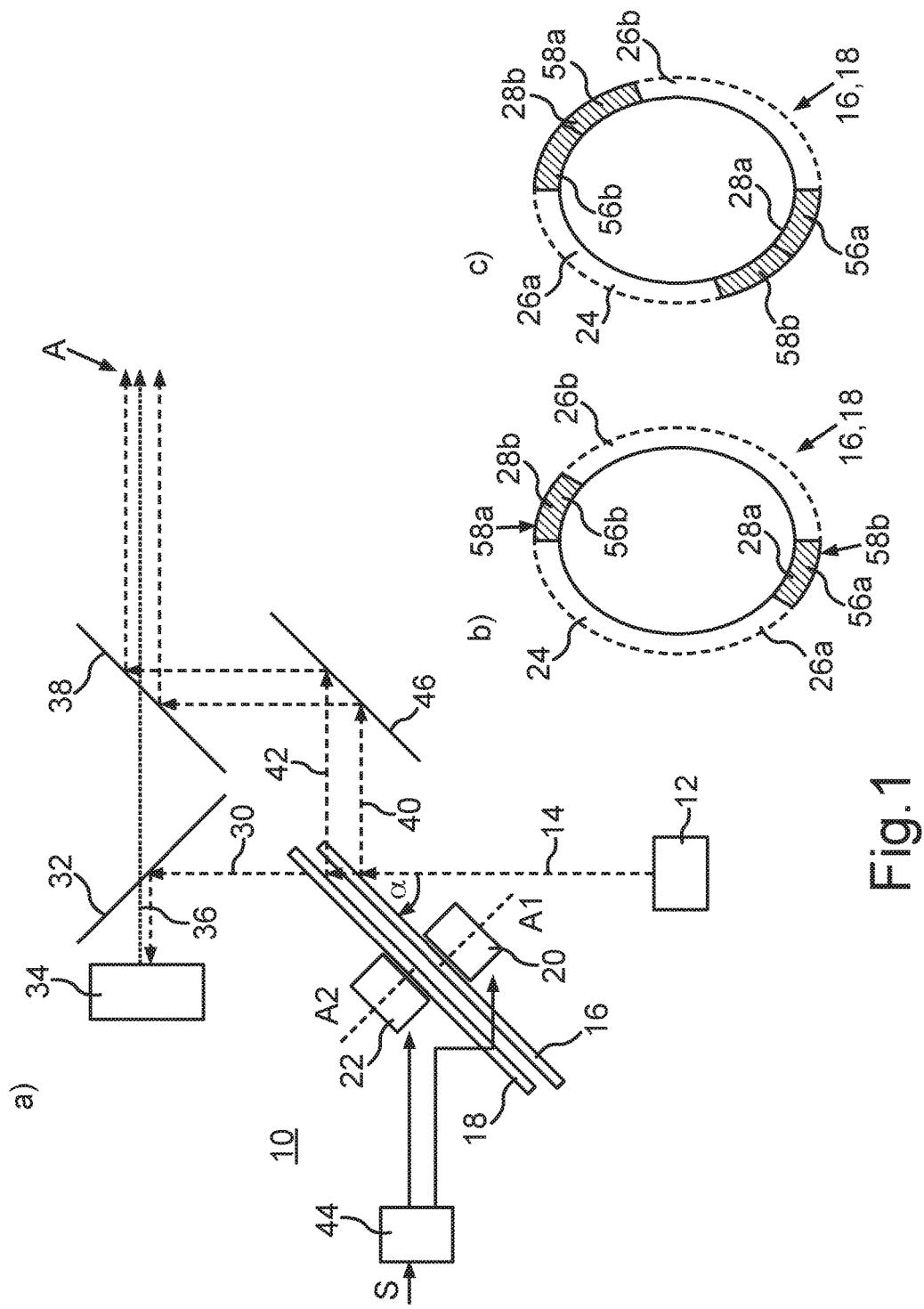
FIG. 1 shows a first embodiment of a light module according to various embodiments, in which the excitation radiation that is reflected at the filter wheels forms the blue channel (transmissive LARP)

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments develop a generic light module such that, for a given excitation radiation source, different color loci that are characterized by a different blue component, are settable at a total luminous flux that is as high as possible, and the lifetime of the light-emitting diodes is not negatively affected hereby.

Various embodiments are based on the finding that varying the color loci, e.g. for setting a desired white light (tunable white), e.g. by varying the blue component with as little loss in total luminous flux as possible is realizable if no large fixed blue segment, which is possibly not used, is available, and instead is configured to be variable, with the result that reducing the blue segment benefits the other segments, and vice versa. In this way, the excitation radiation can in most cases continue to be used without interruption, which results in an optimized total luminous flux. Of course it continues to be possible to vary the output of the excitation radiation within the respective color segments. However, according to various embodiments this is either completely unnecessary, or at least the used pulse powers do not need to be significantly above the nominal power of the laser diodes that are used as the excitation radiation source. This not only results in an increased lifetime of the laser diode(s) that are used as the excitation radiation source, but also of the phosphor(s) used, since the risk of thermal damage to the phosphor no longer exists or is reduced.

The light module according to various embodiments can be used e.g. to generate settable white light (tunable white).

In order to allow this variation of the blue component, various embodiments make provision for the beam splitting apparatus to include a first rotatably mounted filter wheel, which is arranged between the excitation radiation source and the at least one first phosphor and has at least one first transmission region and at least one first reflection region for the excitation radiation, and at least a second rotatably mounted filter wheel, which has at least one second transmission region and at least one second reflection region for the excitation radiation, with the first and the second filter wheel being arranged with respect to one another such that at least the first transmission region, the first reflection region, the second transmission region, and the second reflection region together define a total transmission region and a total reflection region.

In this way, there is first the possibility of varying the position of the first filter wheel with respect to the second filter wheel, which results in an overlap of a transmission region of one filter wheel and a reflection region of the other filter wheel. This segment then contributes to the total reflection region. By varying the degree of overlap, it is thus possible to vary the total reflection region for the benefit or to the detriment of the total transmission region. As will be explained in more detail below, the radiation passing through the total transmission region can be used either as a blue channel or can be guided to the at least one phosphor. Accordingly, the radiation reflected at the total reflection region can be guided to the phosphor or be used as the blue channel.

In consequence, it is thus possible to create, by way of a relative movement between the two filter wheels, for example a blue component segment—formed by the size of the total transmission region or the total reflection region, depending on the embodiment—that is necessary for generating the color locus of an image that is to be projected with a light module according to various embodiments. The portion of the excitation radiation that is not used for the blue component is thus available to the at least one phosphor for conversion and therefore contributes to maximizing the total luminous flux at the respective color locus. For the majority of the images to be projected, a light module according to various embodiments can therefore operate without pulsing the laser diodes, which are used to generate the excitation radiation, in output ranges that are above the nominal power.

Contrary to the conventional systems, in a light module according to various embodiments, the first and second partial optical paths are already split upstream of the phosphor or the phosphor wheel.

The first filter wheel may be arranged in the partial optical path, which starts from the excitation radiation source, upstream of the second filter wheel, wherein a first partial optical path is formed owing to the excitation radiation passing through both the first and the second transmission region. A second partial optical path is formed owing to the excitation radiation being reflected at the first reflection region. A third partial optical path is formed owing to the excitation radiation passing through the first transmission region and being reflected at the second reflection region.

In a first of the two above-mentioned embodiments, the first partial optical path includes the at least one first phosphor, with the second and third partial optical paths not including the at least one first phosphor. This embodiment is referred to as transmissive LARP. In the second of the two embodiments already mentioned, the second and the third partial optical paths include the at least one first phosphor, with the first partial optical path not including the at least one first phosphor. This embodiment is referred to as reflective LARP.

Accordingly, in the first-mentioned embodiment, the excitation radiation which passes through both filter wheels is directed onto the at least one phosphor, while the excitation radiation which is reflected at the filter wheels forms the blue channel. In the second-mentioned embodiment, in contrast to the first-mentioned embodiment, the excitation radiation that passes through both filter wheels is used as the blue channel, while the radiation that is reflected at the filter wheels is directed onto the at least one phosphor.

With respect to the arrangement of the two filter wheels and the driving thereof, a distinction can once again be made between in each case two embodiments: in a first variant, the light module accordingly furthermore includes a drive apparatus for the first and the second filter wheel. The drive apparatus is configured to rotate the first and the second filter wheel in the same direction (as viewed from the excitation radiation source). This variant is referred to as overlapping operation. One effect of this variant is e.g. that the spatial requirement of the two filter wheels can be kept very small, which results in a highly compact structure of such a light module. In the second variant, the light module likewise includes furthermore a drive apparatus for the first and the second filter wheel, but here the drive apparatus is configured to rotate the first and the second filter wheel in mutually opposite directions (as viewed from the excitation radiation source). This variant is referred to as interleaved operation. Since in the overlapping operation, two drive apparatuses must be positioned opposite each other, the spacing in this variant cannot be arbitrarily small owing to technical tolerances of the two filter wheels. As will be explained in more detail below, the spacing between the two filter wheels results in a parasitic beam offset. However, in the interleaved operation, the two filter wheels can be guided very close to one another, with the result that the beam offset and thus the spatial distribution of the output radiation becomes smaller without additional measures than in the overlapping operation.

In the first variant, the first filter wheel may have a first rotation axis and the second filter wheel has a second rotation axis, which run parallel to one another, wherein the first and the second filter wheel are arranged such that the extension of the rotation axis of the first filter wheel passes through the second filter wheel, and vice versa. In other words, the two filter wheels are accordingly arranged substantially or factually one behind the other, as viewed from the excitation radiation source. If the two filter wheels are of identical size, the two rotation axes are slightly offset with respect to one another. In various embodiments, if the two filter wheels are not of identical size, they can also be situated on one rotation axis if the arrangements of the transmission and reflection regions, i.e. the positioning thereof on the respective filter wheel, are matched to one another.

In the first variant, the first and the second filter wheel may furthermore be arranged such that the planes into which the first and the second filter wheel extend assume a specifiable angle, e.g. an angle of 45 degrees, with respect to the propagation direction of the excitation radiation emitted by the excitation radiation source, wherein the first and the second filter wheel are arranged with respect to one another such that their projections in the direction of the excitation radiation overlay one another. With such an arrangement, the individual partial optical paths can be merged again particularly easily, and in addition a very compact structure of such a light module is obtained.

In the second variant, it may be provided if the first filter wheel has a first rotation axis and the second filter wheel has a second rotation axis, which run parallel with respect one another, wherein the first and the second filter wheel are arranged such that the extension of the rotation axis of the first filter wheel does not pass through the second filter wheel, and vice versa. The filter wheels may accordingly be arranged on top of one another or next to one another, such that their projections in the direction of the excitation radiation merely overlay one another in the region of the edge regions of the filter wheels that define the transmission and reflection regions. To this extent, what may be provided in this variant is that the first and the second filter wheel are arranged such that, during rotation, the edge regions of the two filter wheels, by which the respective transmission regions and the respective reflection regions are formed, overlap in an overlap region at least in a phase-wise manner, wherein the excitation radiation source is arranged such that it emits the excitation radiation onto the overlap region, wherein the first and the second filter wheel are arranged in particular such that the planes into which the first and the second filter wheel extend assume a specifiable angle, in particular an angle of 45 degrees, with respect to the propagation direction of the excitation radiation emitted by the excitation radiation source.

In all stated embodiments and variants, a parasitic beam offset arises in the second and third partial optical paths due to the unavoidable spacing between the two filter wheels. However, this can in most cases easily be compensated for by the good etendue of the excitation radiation (as compared to the conversion radiation) which is generated as mentioned e.g. by way of laser diodes. In this context, the embodiment in which the second and third partial optical paths include the phosphor, i.e. are imaged thereon, e.g. advantageous, because the conversion radiation coming from the at least one phosphor naturally has a worse etendue than the excitation radiation, and to this extent, no disadvantage arises on account of the beam offset.

Even though the construction of the light module according to various embodiments using two filter wheels in principle already provides the possibility that the first and the second filter wheel are arranged with respect to one another such that they act together to define a total transmission region and a total reflection region, it is of course e.g. provided if the first and the second filter wheel are arranged such that they are movable relative to one another such that the total transmission region and the total reflection region are variable. By ensuring that the two filter wheels are movable relative to one another, it is accordingly possible to change the total transmission region to the detriment or for the benefit of the total reflection region, and vice versa.

What may be provided in this context is if the light module includes a control apparatus which is configured to position the first and the second filter wheel relative to one another in dependence on a control signal. This provides the possibility in principle of changing the total transmission region and the total reflection region "on-the-fly," i.e. in real time, e.g. depending on requirements. In various embodiments, the control signal is accordingly derived from the blue component of an image that is to be projected with the light module. In this way, optimized positioning of the total transmission region and thus of the total reflection region is possible in dependence on the image to be projected, which results in a maximum total luminous flux.

Back to the two stated embodiments (transmissive and reflective LARP): In the first-mentioned embodiment, both filter wheels run synchronously without angular offset with respect to one another in order to make the blue component as small as possible. If the blue component is intended to be as large as possible, the two filter wheels run with an angular offset with respect to one another, which enlarges the effective reflective surface area, i.e. the total reflection region. This is true in the reverse for the second-stated embodiment.

In general, the at least one phosphor can be arranged such that it is stationary. However, it can also be arranged, e.g. including a large number of phosphors, on a rotatably mounted color wheel. In this case, the phosphor wheel may be synchronized with the filter wheels, for example in order to make possible what is known as UNISHAPE operation with multiple colors. Accordingly, when using a rotating phosphor wheel, segments with phosphors emitting in different wavelength ranges can be provided.

FIG. 1a shows a schematic illustration of a first embodiment of a light module 10 according to various embodiments. It includes an excitation radiation source 12, which includes e.g. at least one laser diode emitting the excitation radiation 14 e.g. in the blue wavelength range (350 nm to 500 nm). A first filter wheel 16 is arranged in the optical path, which starts from the excitation radiation source 12, upstream of a second filter wheel 18. The first filter wheel 16 is driven via a first drive apparatus 20, and the second filter wheel 18 is driven via a second drive apparatus 22. The rotation axis of the first filter wheel 16 is designated A1, and that of the second filter wheel 18 A2. FIG. 1b and FIG. 1c show the view of the two filter wheels 16, 18 as viewed from the excitation radiation source 12. As can be seen more clearly with respect to FIG. 1b and FIG. 1c, each filter wheel 16, 18 has in the present case in an edge region 24 two transmission regions and two reflection regions for the excitation radiation 14. The transmission regions of the first filter wheel 16 are designated 56a and 56b, and those of the second filter wheel 18 58a and 58b.

The illustrations in FIG. 1b and FIG. 1c show the overlap of the two filter wheels 16, 18 which thus define a total transmission region that includes the partial transmission regions 26a and 26b and a total reflection region that includes the partial reflection regions 28a and 28b. Even though the illustration in FIG. 1a does not specify the arrangement of the filter wheels 16, 18, it shall be assumed for the illustrations of FIG. 1b and FIG. 1c by way of example that they are arranged with respect to one another in the manner which will be explained in more detail with respect to FIG. 4. In the illustration of FIG. 1b, the two filter wheels 16, 18 are arranged without angular offset with respect to one another, such that a minimum total reflection region 28a, 28b is produced. In the illustration of FIG. 1c, the two filter wheels 16, 18 are arranged with a specifiable angular offset with respect to one another such that the total reflection region 28a, 28b is at a maximum—as a result of which the total transmission region 26a, 26b is correspondingly at a minimum.

With reference back to FIG. 1a, a first partial optical path 30 is produced by the excitation radiation 14 passing both through a transmission region of the first filter wheel 16 and a transmission region of the second filter wheel 18. The excitation radiation 14, which thus passes through the filter wheels 16, 18, is directed via a dichroic mirror 32 onto a phosphor 34, wherein the phosphor 34 is configured to convert the incident excitation radiation to conversion radiation 36. The latter passes through the dichroic mirror 32, another dichroic mirror 38, which will be referred to again later, and is made available at the exit A as the output signal of the light module 10. A second partial optical path 40 is produced by the excitation radiation 14 being reflected at a reflection region 56a, 56b of the first filter wheel 16. This radiation is guided, via a mirror 46, to the dichroic mirror 38, which likewise deflects it, with the result that this component is made available as a first component of a blue channel at the exit A. A third partial optical path 42 is produced by the excitation radiation 14 passing through a transmission region of the first filter wheel 16 and being reflected at a reflection region 58a, 58b of the second filter wheel 18. The signal in the third partial optical path 42 is likewise first reflected at the mirror 46 and then at the dichroic mirror 38 and made available as the second component of the blue channel at the exit A. As can be easily seen, the dichroic mirrors 32 and 38 and the mirror 46 act as a combining apparatus for the three partial optical paths 30, 40, 42.

The at least one phosphor 34 can be arranged such that it is stationary, but it can also be arranged on a rotatably mounted color wheel, which may include a large number of phosphors that emit conversion radiation in different wavelength ranges.

The filter wheels 16, 18 extend at an angle α with respect to the propagation direction of the excitation radiation 14 emitted by the excitation radiation source 12, with this angle e.g. corresponding to 45 degrees.

A control apparatus 44 is designed to adjust the filter wheels 16 and 18 relative to one another in dependence on a control signal S in order to vary the total reflection region and correspondingly the total transmission region of the light module 10. The control signal S may be derived from the blue component of an image that is to be projected with the light module 10.

Figure 2:
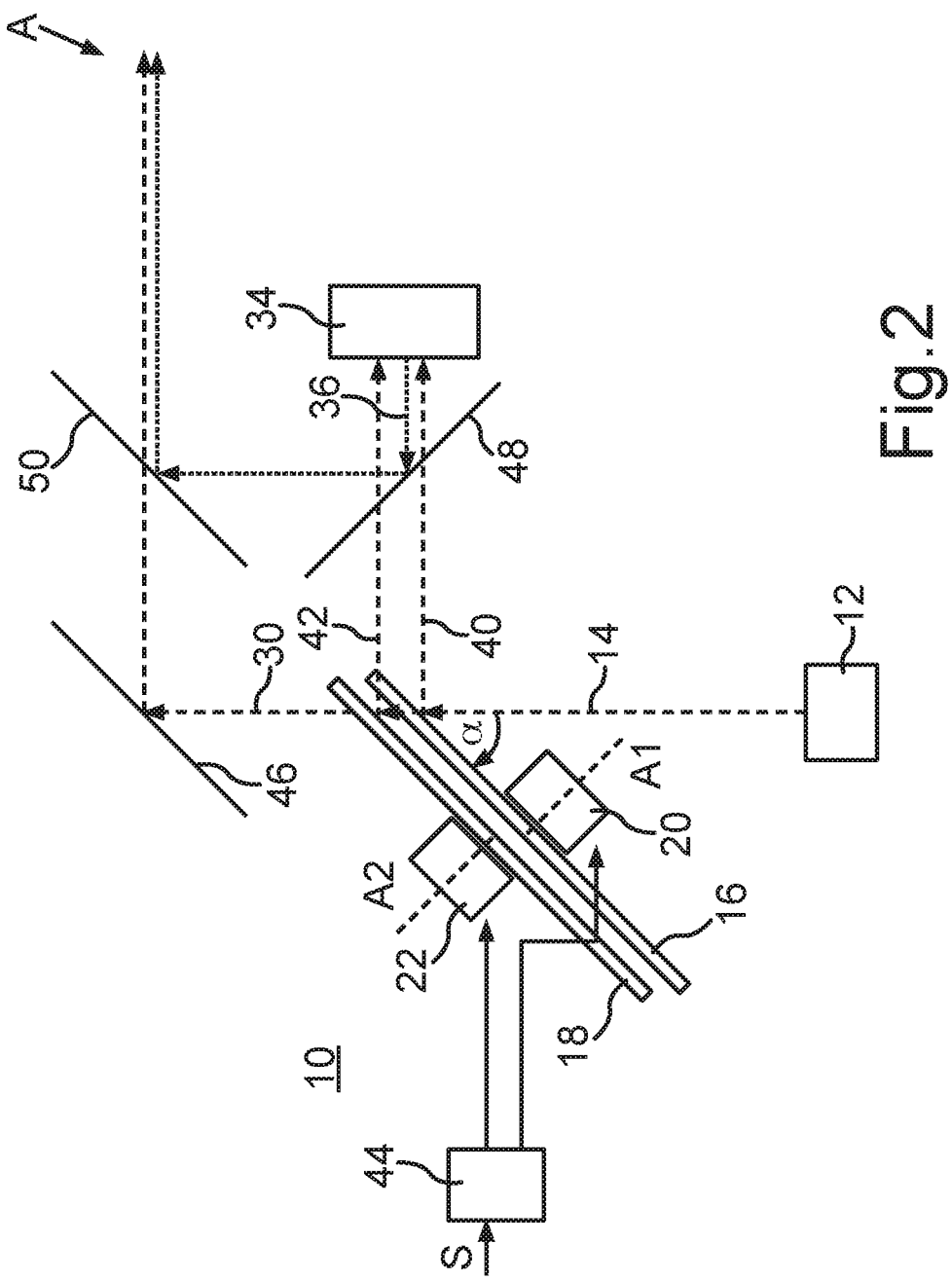
FIG. 2 shows a second embodiment of a light module according to various embodiments, in which the excitation radiation that passes through the filter wheels forms the blue channel (reflective LARP)

While the excitation radiation 14 that is reflected at the filter wheels 16, 18 forms the blue channel in the output signal of the light module 10 that is made available at the exit A in the embodiment illustrated in FIG. 1, the excitation radiation 14 that passes through the two filter wheels 16, 18 is made available at the exit A as the blue channel in the embodiment illustrated schematically in FIG. 2. According to the embodiment illustrated in FIG. 2, the second and third partial optical paths 40, 42 are directed through a dichroic mirror 48, which is transmissive for the excitation radiation 14, onto a phosphor 34 which converts the excitation radiation 14 to conversion radiation 36. The latter is reflected at the dichroic mirrors 48 and 50, which are transmissive for the excitation radiation 14 and reflective for the conversion radiation 36, and made available at the exit A. The signal of the first partial optical path 30 is reflected at the mirror 46, passes through the dichroic mirror 50, and is made available at the exit A as the blue channel.

As already mentioned, the at least one phosphor 38 can be arranged statically, but it can also be arranged, side-by-side with a large number of other phosphors, such that it rotates on a phosphor wheel. Collimation apparatuses for collimating the radiation 14 that is emitted by the excitation radiation source 12, for focusing the radiation that is directed onto the at least one phosphor 34, and for collimating the conversion radiation 36 can be provided, but for the sake of clarity, these are not drawn in the illustrations of FIG. 1 and FIG. 2. Glass, metal, sapphire or ceramic can be used as the substrate material of the phosphor 34. A pulverulent phosphor in an organic or inorganic matrix or a ceramic converter can be used as the phosphor 34. The phosphor 34 may be a phosphor which is excitable with excitation radiation 14 in the range of 350 to 500 nm. As already mentioned, a rotating phosphor wheel can have a plurality of segments with different phosphors, i.e. phosphors that emit in different wavelength ranges. When using a phosphor wheel, it is preferred that it runs synchronously with the filter wheels 16, 18 so as to allow what is known as UNISHAPE operation with a plurality of colors.

With various embodiments, the light that is made available at the exit A, in particular white light, can be set in terms of color temperature by way of changing the overlap of the two filter wheels 16, 18. With various embodiments, substantially higher output powers can be achieved in the different color loci than in the conventional systems. Particularly high powers can be attained with a pulsed blue segment. Here, the excitation radiation source 12 is operated with a higher output power in the blue phases than during the remaining phases.

In the pulsed UNISHAPE operation, all color loci along a connecting line in the CIE xy diagram or individual colors on the phosphor wheel can be set.

As already mentioned, the parasitic beam offset resulting from the spacing between the two filter wheels 16, 18 leads to adaptation to the etendue of the conversion radiation 36.

The previous two principle concepts as presented with reference to FIG. 1 and FIG. 2 can be realized, as regards the arrangement of the filter wheels 16, 18, substantially according to the two variants that are illustrated below with reference to FIG. 3 and FIG. 4.

Figure 3:
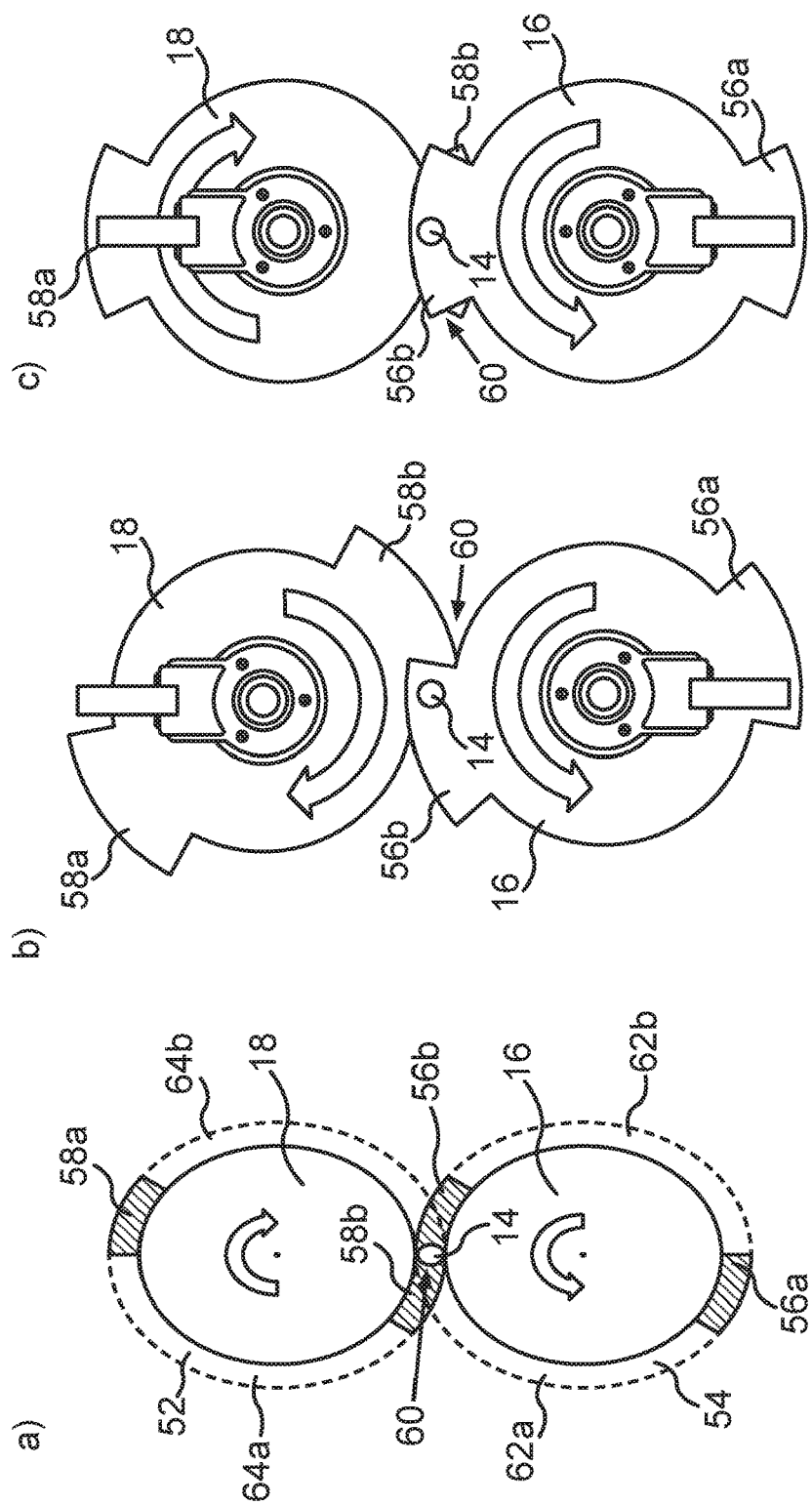
FIG. 3 shows a variant of a light module according to various embodiments, in which only the edge regions of the two filter wheels that define the reflection and transmission regions overlap (interleaved operation)

The variant presented with reference to FIG. 3 is referred to as "interleaved operation". Here, the filter wheels 16, 18 are substantially next to one another, e.g. on top of one another, and overlap in terms of their edge regions 52, 54, which are drawn in dashed lines in the illustration of FIG. 3a, in an overlap region 60. The reflection regions of the filter wheel 16 are designated 56a and 56b, while the reflection regions of the filter wheel 18 are designated 58a and 58b. The transmission regions of the filter wheel 16 are designated 62a and 62b, and those of the filter wheel 18 64a and 64b. The excitation radiation 14 is directed onto this overlap region 60, specifically with preference at an angle of 45 degrees, as already illustrated in FIG. 1 and FIG. 2. The angular positions of the filter wheels 16, 18 can be changed relative to each other by way of the control apparatus 44, for example by keeping one filter wheel fixed in position, while rotating the other through a specifiable rotation angle.

A maximum total reflection region is obtained if the filter wheels 16, 18 are positioned such that the reflection regions 56a, 56b, 58a, 58b do not overlay one another, as is illustrated with reference to FIG. 3b. If the two filter wheels 16, 18 are oriented with respect to the angular position as illustrated in FIG. 3c, the reflection regions 56a, 56b, 58a, 58b of the two filter wheels 16, 18 overlay one another such that a minimum total reflection region is produced.

Figure 4:
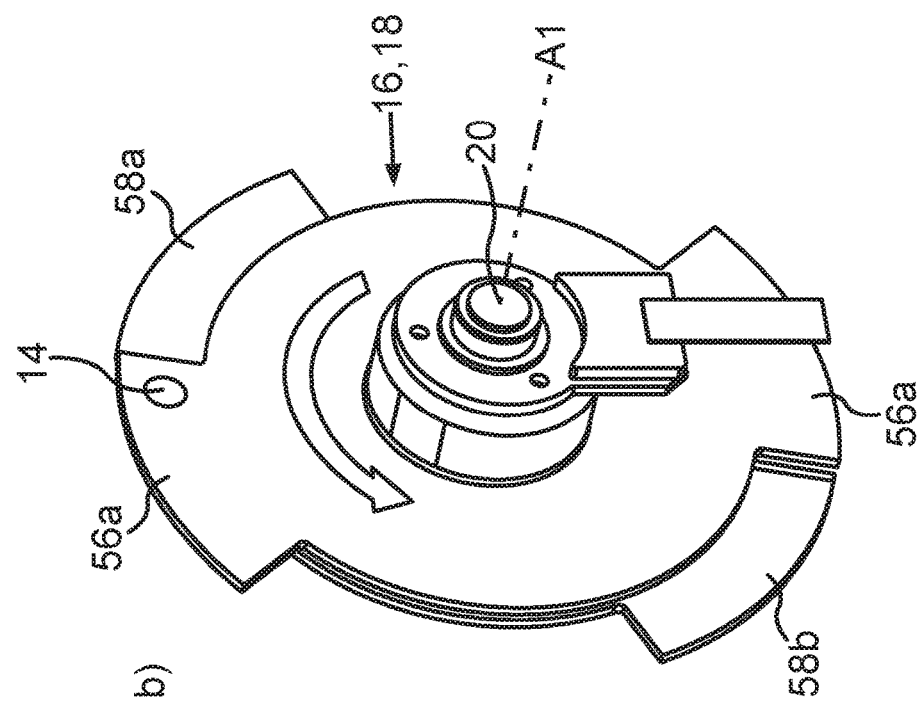
FIG. 4 shows a variant of a light module according to various embodiments, in which the two filter wheels are arranged on a common rotation axis (overlapping operation).
Figure 4:
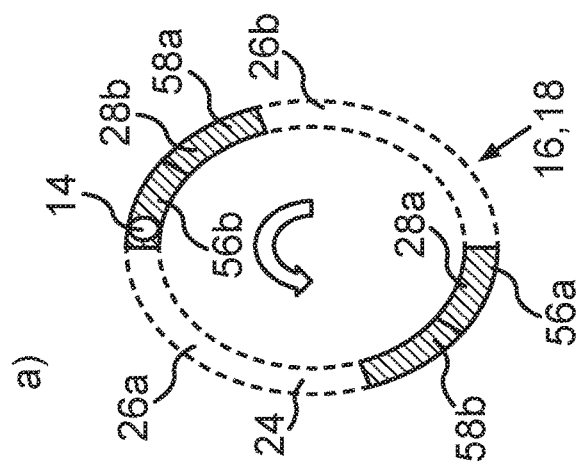

The variant illustrated with reference to FIG. 4 is referred to as "overlapping operation". Here, in the present embodiment, the two filter wheels 16, 18 are arranged on a common rotation axis A1 and are rotated together in the same direction by a drive apparatus 20. The drive apparatus 20, or another drive apparatus, can be configured to vary the angular positions of the two filter wheels 16, 18 with respect to each other in dependence on a control signal of the control apparatus 44. If the angular position of the two filter wheels 16, 18 is set as illustrated in FIG. 4, the reflection regions 56*a*, 58*b* on one side and 56*b*, 58*a* on the other side come to lie next to one another in the circumferential direction, with the result that a maximum total reflection region is produced. The excitation radiation source 14 is directed at the region 60, e.g. at an angle of 45 degrees.

If the angular positions of the two filter wheels 16, 18 with respect to each other are set such that the reflection regions 56*a*, 58*b* on the one side and 56*b* and 58*a* on the other side overlay one another, a minimum total reflection region is produced.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light module, comprising:
an excitation radiation source which is configured to emit excitation radiation;
at least one first phosphor which is configured to convert the incident excitation radiation to first conversion radiation;
a beam splitting apparatus which is configured to generate at least a first and a second partial optical path, with one of the two partial optical paths comprising the at least one first phosphor and the other one comprising, at least during specifiable time periods, the excitation radiation;
a combining apparatus which is configured to merge at least the first and the second partial optical path; and
an exit configured to radiate the merged partial optical paths as an output signal;
wherein the beam splitting apparatus comprises a first rotatably mounted filter wheel, which is arranged between the excitation radiation source and the at least one first phosphor and has at least one first transmission region and at least one first reflection region for the excitation radiation, and at least a second rotatably mounted filter wheel, which has at least one second transmission region and at least one second reflection region for the excitation radiation; wherein the first filter wheel has a first rotation axis and the second filter wheel has a second rotation axis that run parallel to one another as viewed from the excitation radiation source; wherein the first and the second filter wheel are arranged such that the extension of the rotation axis of the first filter wheel does not pass through the second filter wheel, and vice versa;
wherein with the first and the second filter wheel being arranged with respect to one another such that at least the first transmission region, the first reflection region, the second transmission region, and the second reflection region together define a total transmission region and a total reflection region.

2. The light module of claim 1,
wherein the first filter wheel is arranged in the partial optical path, which starts from the excitation radiation source, upstream of the second filter wheel,
wherein a first partial optical path is formed owing to the excitation radiation passing through both the first and the second transmission region,
wherein a second partial optical path is formed owing to the excitation radiation being reflected at the first reflection region, and
wherein a third partial optical path is formed owing to the excitation radiation passing through the first transmission region and being reflected at the second reflection region.

3. The light module of claim 2,
wherein the first partial optical path comprises the at least one first phosphor, with the second and the third partial optical path not comprising the at least one first phosphor.

4. The light module of claim 2,
wherein the second and the third partial optical path comprise the at least one phosphor, with the first partial optical path not comprising the at least one first phosphor.

5. The light module of claim 1, further comprising:
a drive apparatus for the first and the second filter wheel, wherein the drive apparatus is configured to rotate the first and the second filter wheel in the same direction as viewed from the excitation radiation source.

6. The light module of claim 5,
wherein the first filter wheel has a first rotation axis and the second filter wheel has a second rotation axis, which run parallel to one another, wherein the first and the second filter wheel are arranged such that the extension of the rotation axis of the first filter wheel passes through the second filter wheel, and vice versa.

7. The light module of claim 5,
wherein the first and the second filter wheel are arranged such that the planes into which the first and the second filter wheel extend assume a specifiable angle with respect to the propagation direction of the excitation radiation emitted by the excitation radiation source, wherein the first and the second filter wheel are arranged with respect to one another such that their projections in the direction of the excitation radiation overlay one another.

8. The light module of claim 7,
wherein the specifiable angle is an angle of 45 degrees.

9. The light module of claim 1, further comprising:
a drive apparatus for the first and the second filter wheel, wherein the drive apparatus is configured to rotate the first and the second filter wheel in mutually opposite directions.

10. The light module of claim 9,
wherein the first and the second filter wheel are arranged such that, during rotation, the edge regions of the two filter wheels by means of which the respective transmission regions and the respective reflection regions are formed, overlap in an overlap region at least in a phase-wise manner, wherein the excitation radiation source is arranged such that it emits the excitation radiation onto the overlap region.

11. The light module of claim 10,
wherein the first and the second filter wheel are arranged such that the planes into which the first and the second filter wheel extend assume a specifiable angle with respect to the propagation direction of the excitation radiation emitted by the excitation radiation source.

12. The light module of claim 11,
wherein the specifiable angle is an angle of 45 degrees.

13. The light module of claim 1,
wherein the first and the second filter wheel are arranged such that they are movable relative to one another such that the total transmission region and the total reflection region are variable.

14. The light module of claim 13, further comprising:
a control apparatus which is configured to position the first and the second filter wheel relative to one another in dependence on a control signal.

15. The light module of claim 14,
wherein the control signal is derived from the blue component of an image that is to be projected with the light module.

16. The light module of claim 1,
wherein the at least one phosphor is arranged such that it is stationary.

17. The light module of claim 1,
wherein the at least one phosphor is arranged on a rotatably mounted color wheel.

18. The light module of claim 1,
wherein the at least one phosphor comprising a large number of phosphors, is arranged on a rotatably mounted color wheel.

* * * * *